(12) United States Patent
Chou

(10) Patent No.: US 10,291,102 B2
(45) Date of Patent: May 14, 2019

(54) MOTOR WITH HEAT DISSIPATION STRUCTURE

(71) Applicant: Wen-San Chou, Tainan (TW)

(72) Inventor: Wen-San Chou, Tainan (TW)

(*) Notice: Subject to any disclaimer, the term of this patent is extended or adjusted under 35 U.S.C. 154(b) by 216 days.

(21) Appl. No.: 15/191,593

(22) Filed: Jun. 24, 2016

(65) Prior Publication Data

US 2017/0005546 A1    Jan. 5, 2017

(51) Int. Cl.
| | |
|---|---|
| *H02K 9/06* | (2006.01) |
| *H02K 5/20* | (2006.01) |
| *H02K 27/00* | (2006.01) |
| *H02K 5/22* | (2006.01) |
| *H02K 5/26* | (2006.01) |

(52) U.S. Cl.
CPC ............ *H02K 9/06* (2013.01); *H02K 5/20* (2013.01); *H02K 5/225* (2013.01); *H02K 5/26* (2013.01); *H02K 27/00* (2013.01)

(58) Field of Classification Search
CPC   H02K 9/06; H02K 5/20; H02K 5/225; H02K 5/26; H02K 27/00
USPC ....... 310/62–63, 71, 89, 238–239, 400, 416, 310/417
See application file for complete search history.

(56) References Cited

U.S. PATENT DOCUMENTS

| | | | | |
|---|---|---|---|---|
| 2,154,146 A | * | 4/1939 | Becker | H02K 1/185 310/407 |
| 3,081,411 A | * | 3/1963 | Wiley | H02K 5/04 29/598 |
| 3,701,911 A | * | 10/1972 | Hallerback | H02K 5/15 310/60 R |
| 4,853,576 A | * | 8/1989 | Mayumi | H02K 5/145 29/597 |
| 5,563,462 A | * | 10/1996 | Strobl | H02K 5/145 310/51 |
| 6,040,645 A | * | 3/2000 | Lynch | H02K 3/04 310/227 |
| 8,421,317 B2 | * | 4/2013 | Jiang | H02K 5/148 310/239 |
| 9,071,113 B2 | * | 6/2015 | Abe | H02K 5/225 |
| 2013/0078119 A1 | * | 3/2013 | Chou | F04B 35/01 417/374 |

* cited by examiner

*Primary Examiner* — Burton S Mullins (57) ABSTRACT

A motor includes a housing, a front cover, a rotating shaft, and a cooling fan. The front cover is formed with multiple air guiding fins and multiple first inlet holes. The housing is formed with multiple air intercepting fins and multiple second inlet holes. In use, one portion of the air current generated by the cooling fan can be guided by the air guiding fins to pass through the first inlet holes to enter the motor's housing. Another portion of the air current can be intercepted by the air intercepting fins to pass through the second inlet holes to enter the motor's housing. The way of dissipating heat through multiple paths allows the heat generated in the motor to be dissipated more effectively, so that heat is not easy to accumulate in the motor.

4 Claims, 9 Drawing Sheets

MOTOR WITH HEAT DISSIPATION STRUCTURE

(a) TECHNICAL FIELD OF THE INVENTION

The present invention relates to a motor with a heat dissipation structure and, more particularly, to a motor which can dissipate the heat generated in its housing through multiple paths, so that heat is not easy to accumulate in the motor's housing, and thus the performance and service life of the motor can be increased.

(b) DESCRIPTION OF THE PRIOR ART

In today's industry, motors are one of commonly used devices for providing mechanical power. However, while a motor is running, heat is easy to accumulate in the motor's housing. If the heat is not timely dissipated, the magnetic field provided by the magnets in the motor' housing will decrease, so that the performance of the motor can be gradually reduced. Besides, when the temperature in the motor rises to a certain level, the coils or enamel wires in the motor can be damaged, and this may cause a short circuit, and thus the motor may burn out. For preventing such a problem, a motor is usually provided with a cooling fan. However, the air current generated by the cooling fan of the motor can merely flow along the outer surface of the motor's housing, but cannot flow into the interior of the motor, and thus the capacity of dissipating the heat generated in the motor is limited. The problem of the heat accumulation in the motor's housing has not yet been solved completely.

SUMMARY OF THE INVENTION

One object of the present invention is to provide a motor which can dissipate the heat generated in its housing through multiple paths.

According to one feature of the present invention, the motor generally includes a housing, a front cover, a rotating shaft, and a cooling fan. The housing defines therein an inner space with a front opening. The front cover, which closes the front opening of the housing, is pressed to form a plurality of air guiding fins and a plurality of first inlet holes corresponding to the air guiding fins. As such, a central portion of the air current generated by the cooling fan can be guided by the air guiding fins to pass through the first inlet holes of the front cover, thus entering the housing, whereby the heat generated in the motor can be dissipated effectively.

According to another feature of the present invention, the surrounding wall of the housing is pressed to form a plurality of air intercepting fins and a plurality of second inlet holes corresponding to the air intercepting fins, so that an outer portion of the air current, which is outside the area surrounded by the air guiding fins of the front cover, can be intercepted by the air intercepting fins to pass through the second inlet holes of the housing, thus entering the motor's housing, whereby the heat generated in the motor can be dissipated more effectively.

According to one advantage of the present invention, the motor can be used in a high-temperature environment without being damaged. In a test, the motor was continuously operated in a closed space of 70 degrees C. for a long time without burning out.

Other objects, advantages, and novel features of the present invention will become more apparent from the following detailed description when taken in conjunction with the accompanying drawings.

DETAILED DESCRIPTION OF THE PREFERRED EMBODIMENTS

Since the structure and operation of a motor has been known widely, a detailed description thereof is not provided in the following paragraphs.

Figure 1:
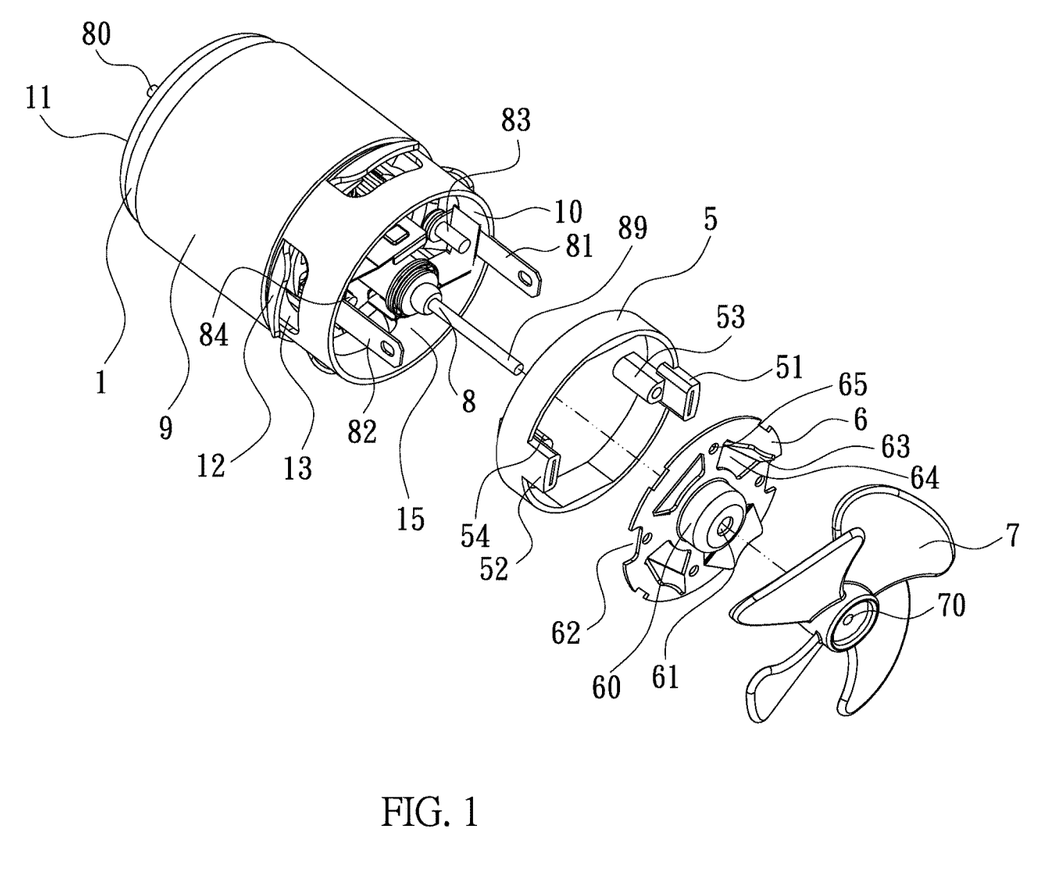
FIG. 1 shows an exploded view of a motor according to one embodiment of the present invention.
Figure 2:
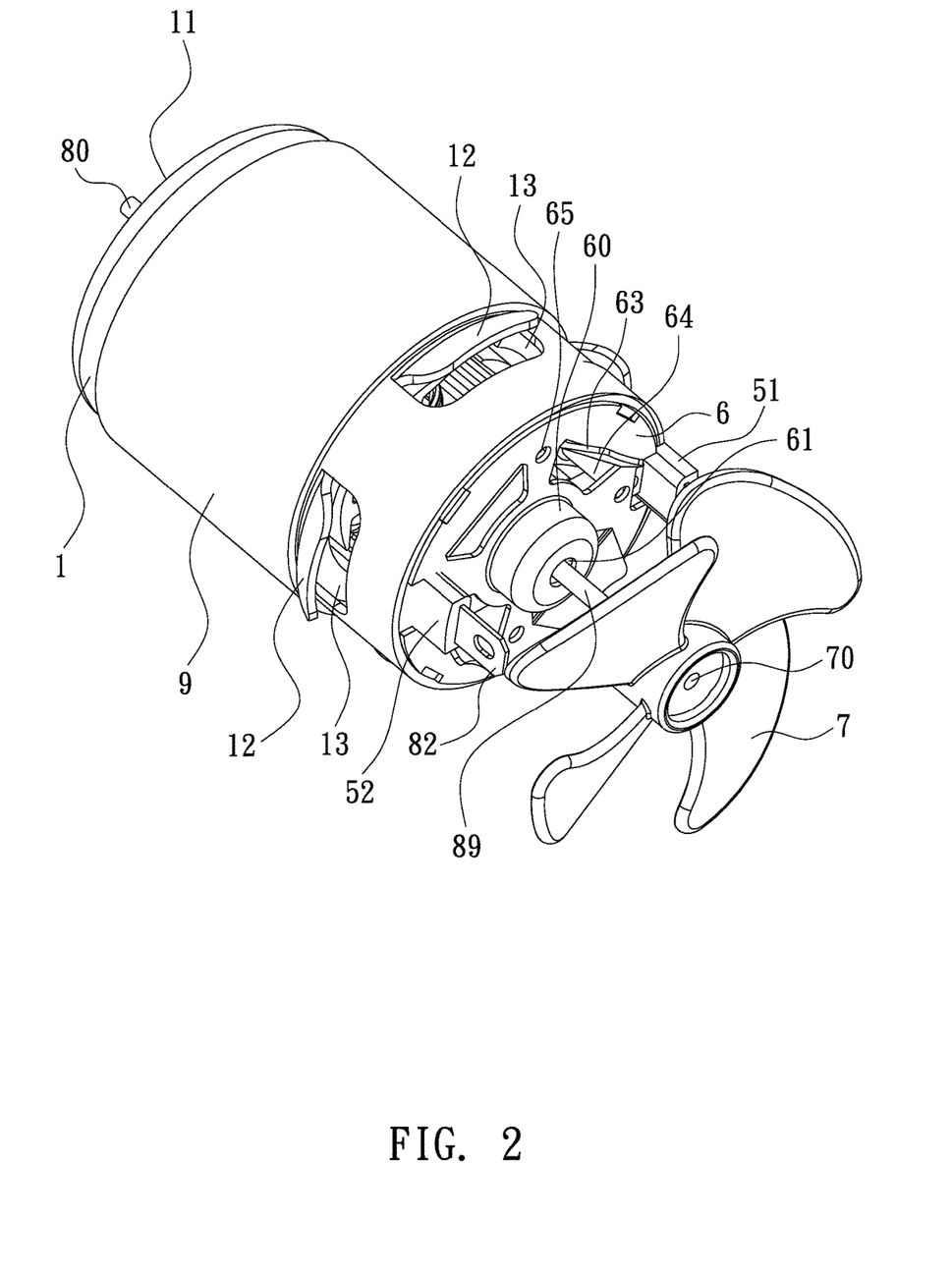
FIG. 2 shows a 3-dimensional view of the motor.
Figure 3:
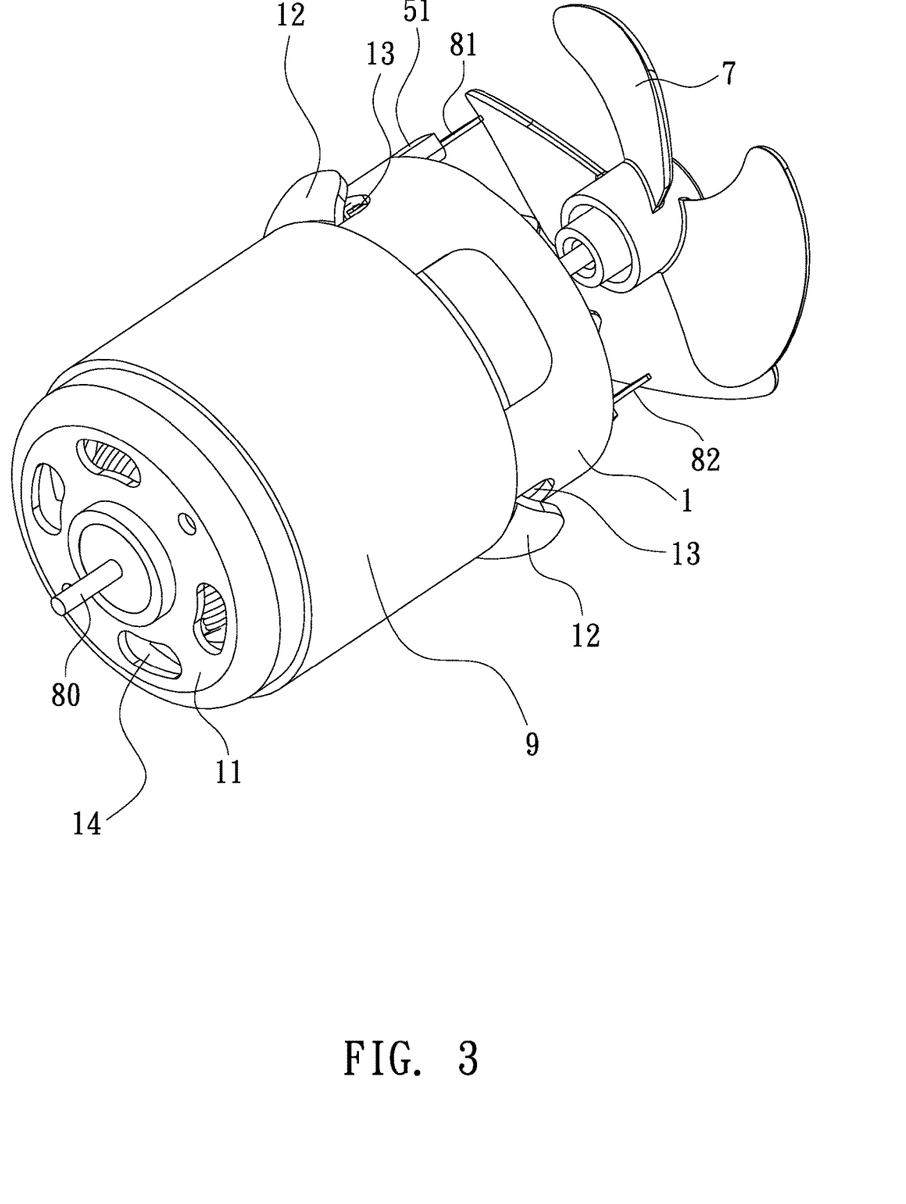
FIG. 3 shows another 3-diemensional view of the motor, which is viewed from a different angle than FIG. 2.
Figure 6:
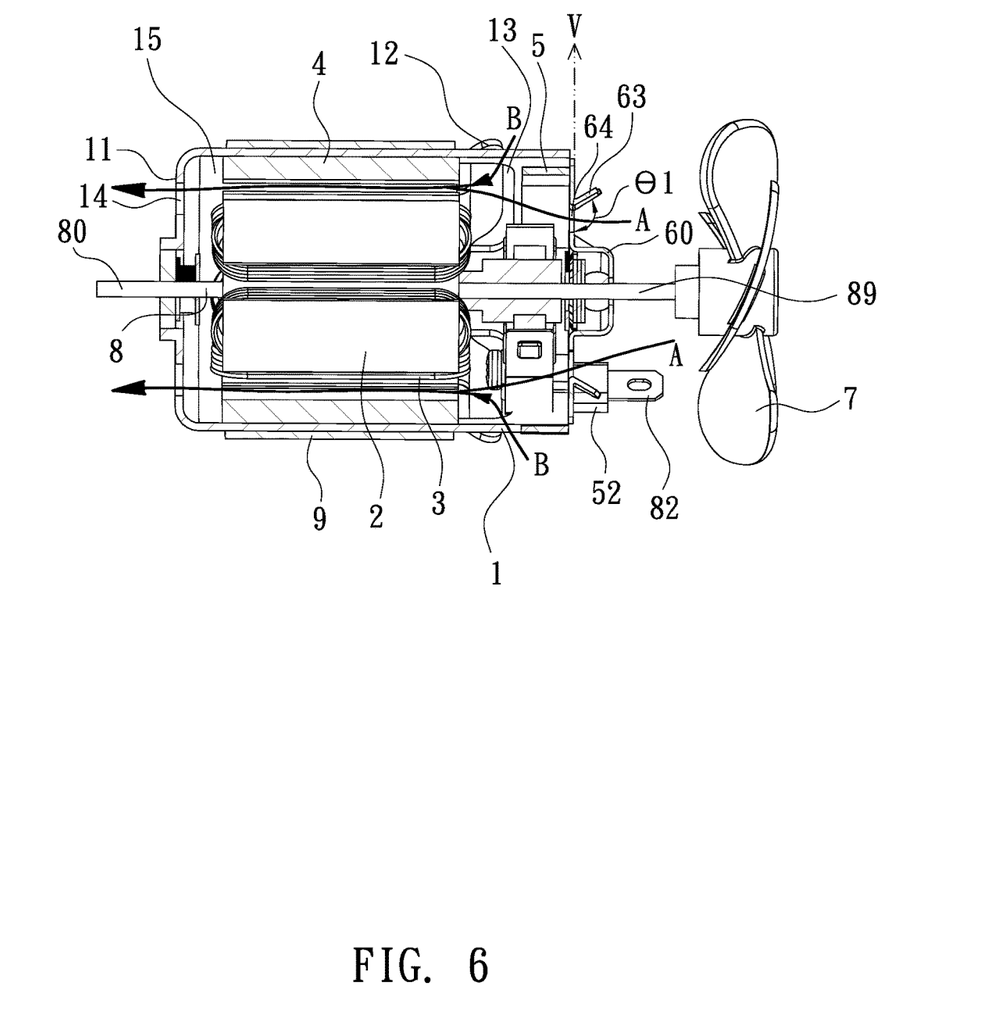
FIG. 6 shows a sectional view of the motor, which demonstrates a first airflow path (A) for one portion of the air current for dissipating the heat generated in the motor.
Figure 7:
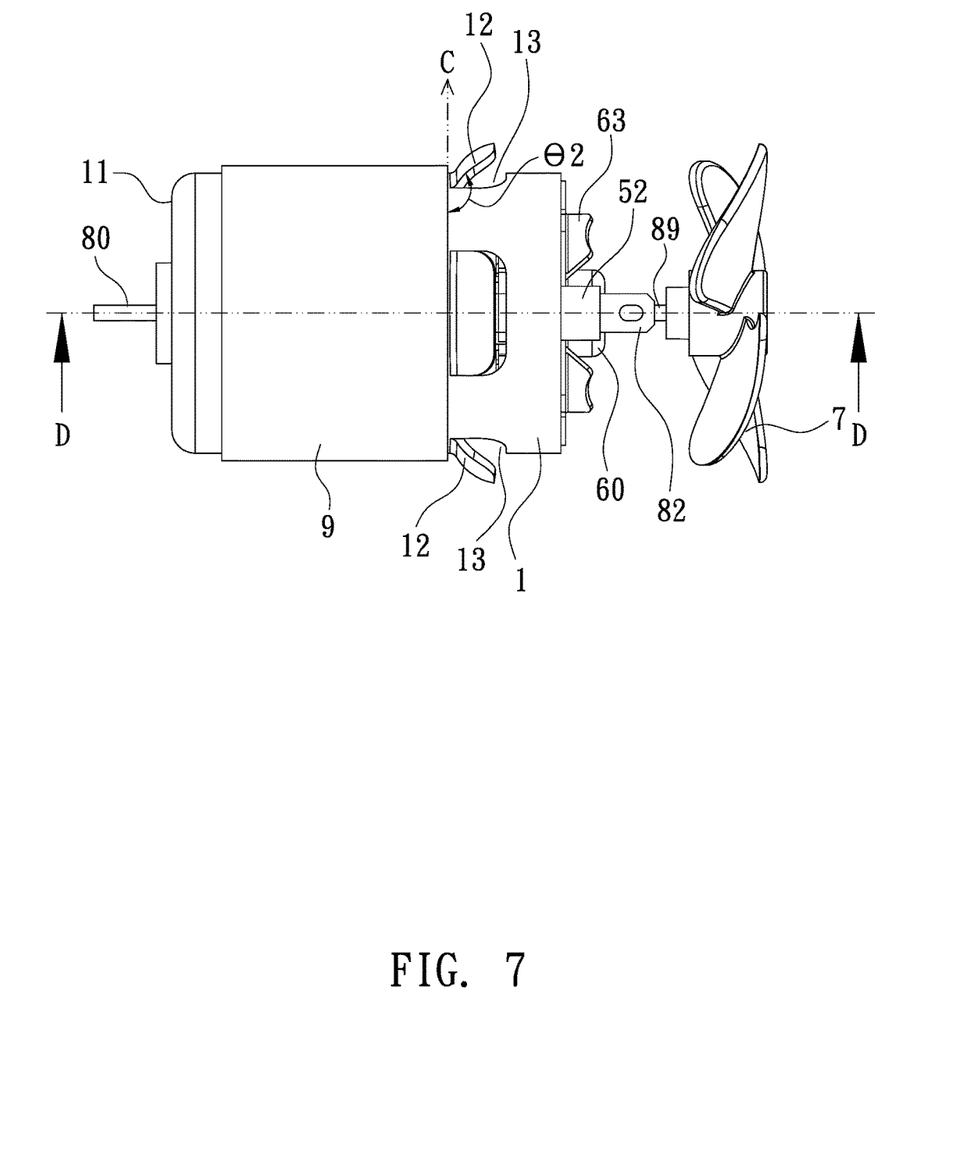
FIG. 7 shows another plan view of the motor, which is viewed from a different angle than FIG. 5.

Referring first to FIGS. 1 through 3, a motor according to one embodiment of the present invention is shown, which generally includes a housing 1, a mounting collar 5, a front cover 6, a rotating shaft 8, and a cooling fan 7. The housing 1 defines therein an inner space 15 with a front opening 10 and has a rear closure wall 11 opposite to the front opening 10. The rear closure wall 11 defines a central hole, in which a bearing may be mounted, and a plurality of outlet holes 14 around the central hole. The surrounding wall of the housing 1 is pressed to form a plurality of air intercepting fins 12, which are bent outwardly such that a plurality of inlet holes 13 are defined next to the corresponding the air intercepting fins 12. The air intercepting fins 12 extend generally towards the front opening 10 of the housing 1 or the cooling fan 7, at a predetermined angle of ($\Theta 2$) to a cross-sectional plane (C) of the housing 1 which is perpendicular to the rotating shaft 8 (see FIG. 7), wherein the predetermined angle ($\Theta 2$) is greater than 90 degrees. Furthermore, a rotor 2, coils 3 and magnets 4, which are necessary elements for a motor, are provided in the inner space 15 of the housing 1 (see FIG. 6). The rotating shaft 8 is mounted across the inner space 15 of the housing 1, wherein the rotating shaft 8 has a first end 80 which is inserted through the central hole of the rear closure wall 11 for connecting with a transmission mechanism (not shown) for providing necessary mechanical power. The rotating shaft 8 has a second end 89 which is inserted out of the front opening 10 of the housing 1 to be fitted with the cooling fan 7, as will be further illustrated below. A magnetically permeable sleeve 9, being made of metal, is closely fitted around the outer surface of the housing 1, so that the performance of the motor can be increased.

The mounting collar 5 has two sheaths 51, 52 and two mounting tubes 53, 54, the sheaths 51, 52 extending from one peripheral edge of the mounting collar 5 and parallel to a central axis of the mounting collar 5, the mounting tubes 53, 54 extending from an opposite peripheral edge of the mounting collar 5 and parallel to the central axis of the mounting collar 5, wherein the two sheaths 51, 52 allow two electrical terminal blades 81, 82 provided in the housing 1 to insert therethrough, while the two mounting tubes 53, 54 allow two fixing dowel rods 83, 84 provided in the housing 1 to slide therein.

The front cover 6, which is substantially disk-shaped, has a central hub 60 defining a central hole 61 and has a peripheral portion formed around the central hub 60. The front cover 6 is pressed to form a plurality of air guiding fins 63, which are bent outwardly from the peripheral portion of the front cover 6 such that a plurality of inlet holes 64 are defined next to the corresponding guiding fins 6, and the air guiding fins 63 surround the inlet holes 64. The air guiding fins 63 extend generally towards the cooling fan 7, so that they are at a predetermined angle of (.THETA.1) to a reference plane (V), which is perpendicular to the rotating shaft 8 or with which the front cover 6 is coincident (see FIG. 6), wherein the predetermined angle (.THETA.1) is greater than 90 degrees. Furthermore, the front cover 6 defines at its outer edge two opposite cutouts 62 which are capable of engaging with the sheaths 51, 52 of the mounting collar 5, so as to fix the front cover 6 to the mounting collar 5 which is in turn fixed to the housing 1, thus closing the front opening 10 of the housing 1. In addition, the front cover 6 defines a plurality of fixing holes 65, through which a plurality of screws can be engaged with other portions of the housing 1 (not shown), so that the front cover 6 can be fixed more firmly. While the front cover 6 is being coupled to the housing 1 by the mounting collar 5, the second end 89 of the rotating shaft 8 can be inserted through the central hole 61 of the central hub 60 of the front cover 6, wherein a bearing (not shown) may be provided in the central hub 60 of the front cover 6 and fitted with the second end 89 of the rotating shaft 8.

The cooling fan 7 defines a central hole 70, into which the second end 89 of the rotating shaft 8 extending out of the central hole 61 of the front cover 6 can be fitted, so that the fan 7 is attached to and rotated together with the rotating shaft 8.

Figure 4:
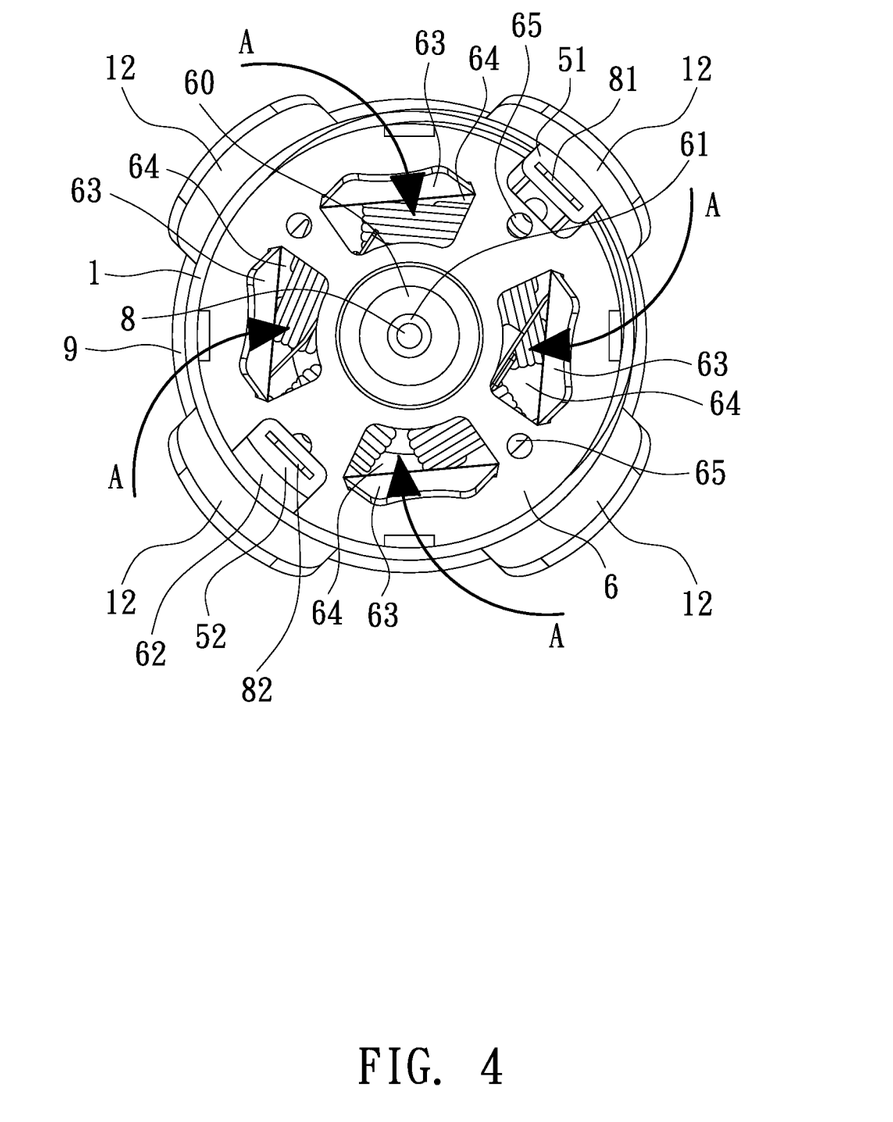
FIG. 4 shows a working view of the motor, which demonstrates the air current being guided by the air guiding fins to enter the associated inlet holes of the front cover.
Figure 5:
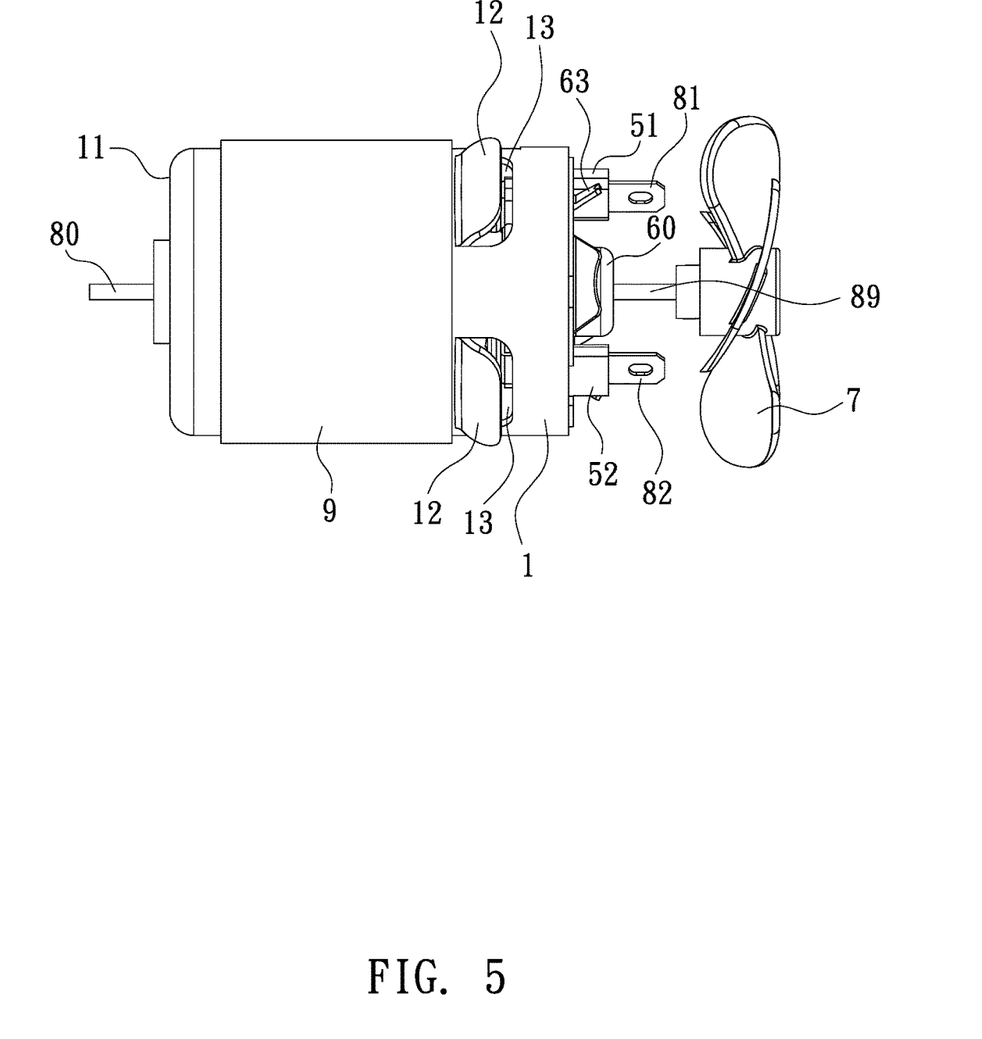
FIG. 5 shows a plan view of the motor.
Figure 8:
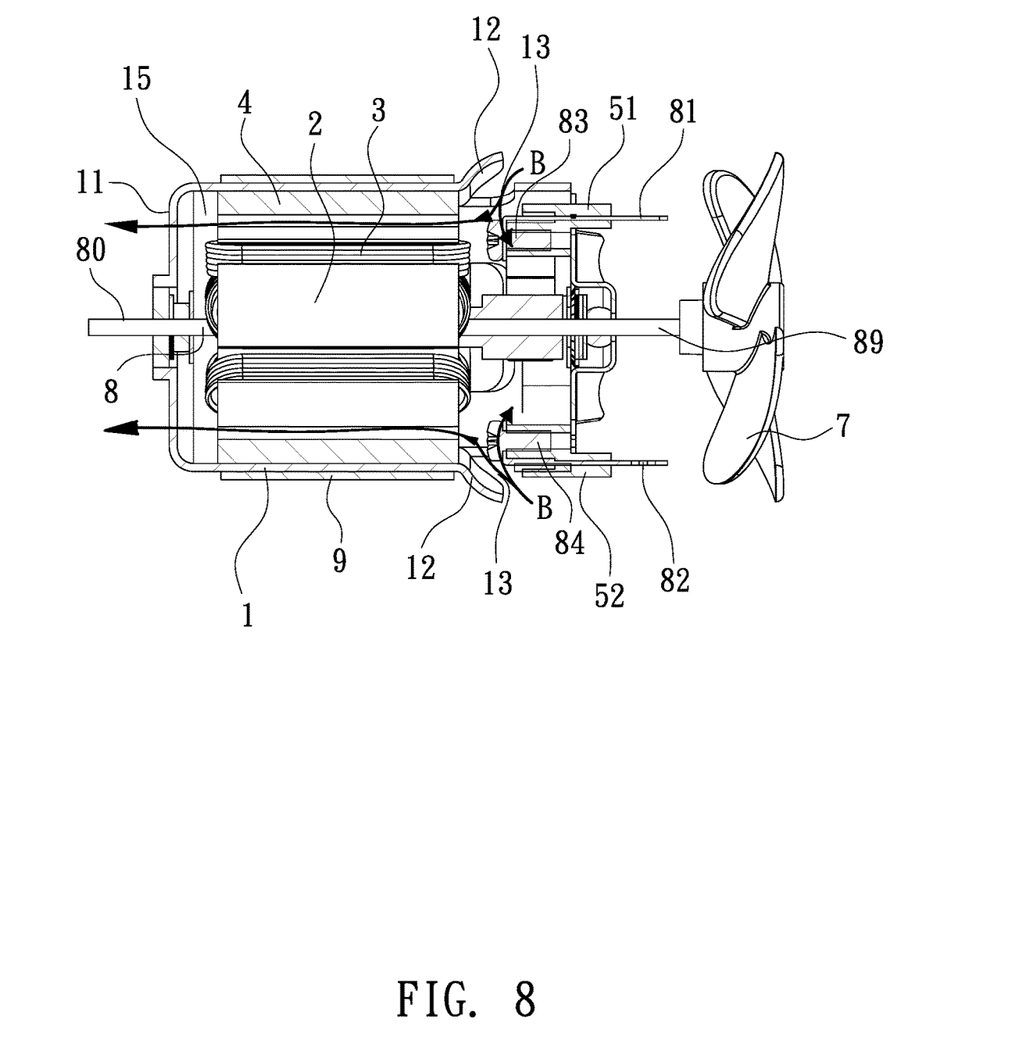
FIG. 8 shows a sectional view of the motor taken along line D-D in FIG. 7, which demonstrates a second airflow path (B) for another portion of the air current for dissipating the heat generated in the motor.
Figure 9:
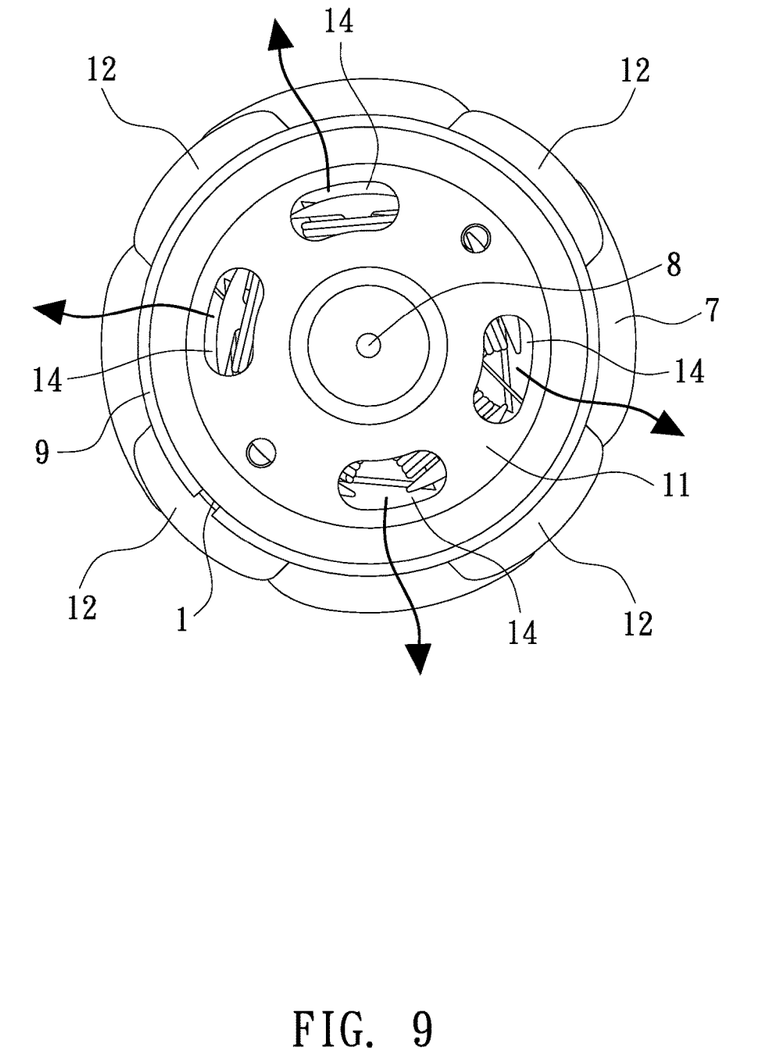
FIG. 9 shows a working view of the motor, which demonstrates the air current flowing out of the motor's housing via the outlet holes thereof to take away the heat generated in the motor.

FIGS. 2 and 3 show one embodiment of the motor being assembled from the housing 1, the mounting collar 5, the front cover 6, and the cooling fan 7. When the motor is started, the cooling fan 7 can be rotated together with the rotating shaft 8 to generate a whirling, ongoing air current towards the front cover 6, so that the air at the right side of the cooling fan 7 can be forced to flow into the left side of the cooling fan 7 (see FIG. 5). In particular, the air current can enter the inner space 15 of the housing 1 through multiple paths, so that the heat generated in the housing 1 can be dissipated more effectively (see FIGS. 4, 6, 7 and 8). A central portion of the air current generated by the cooling fan 7 can be guided by the air guiding fins 63 of the front cover 6 to pass through the associated inlet holes 64 and thus to enter the inner space 15 of the housing 1. While the motor is running, the central portion of the air current may follow a first airflow path (A) to dissipate the heat generated in the housing 1 (see FIGS. 4 and 6). An outer portion of the air current generated by the cooling fan 7, which is outside the area surrounded by the air guiding fins 63 of the front cover 6, can be intercepted by the air intercepting fins 12 to pass through the associated inlet holes 13 of the housing 1 and thus to enter the inner space 15 of the housing 1. While the motor is running, the outer portion of the air current may follow a second airflow path (B) to increase the capacity of dissipating the heat generated in the housing 1 (see FIG. 8). The air entering the inner space 15 of the housing 1 can flow out of the housing 1 via the outlet holes 14 of the rear closure wall 11 of the housing 1 (see also FIG. 9), and thus the heat generated in the housing 1 can be taken away with the air. The two airflow paths (A) (B) allow the heat generated in the housing 1 to dissipate more effectively, so that the temperatures of the rotor 2, coils 3, and magnets 4 can be restrained more effectively.

As a summary, the air intercepting fins 12 and the associated inlet holes 13 of the housing 1 allow the motor of the present invention to provide an airflow path (B) for dissipating the heat generated in the housing 1, while the air guiding fins 63 and the associated inlet holes 64 allow the motor to provide another airflow path (A) to increase the capacity of dissipating heat. Since the air current generated by the cooling fan 7 can enter the inner space 15 of the housing 1 via both airflow paths (A) (B) to timely and effectively dissipate the heat generated in the housing 1, so that heat is not easy to accumulate in the housing 1 of the motor; therefore, maximum power output of the motor can be achieved, and the performance and service life of the motor can be increased. Thus, even though the motor is operated in a high-temperature environment, it will not burn out. These features render the motor of the present invention useful and inventive.

I claim:
1. A motor including a housing, a front cover, a rotating shaft, and a cooling fan, wherein the housing defines therein an inner space with a front opening and has a rear closure wall opposite to the front opening, the rear closure wall defining a central hole and a plurality of outlet holes; the front cover, which is substantially disk-shaped, closes the front opening of the housing and has a central hub defining a central hole and has a peripheral portion formed around the central hub; the rotating shaft is mounted across the inner space of the housing, the rotating shaft having a first end which is inserted through the central hole of the rear closure wall and having a second end which is inserted through the central hole of the hub of the front cover; the cooling fan is fixed to the second end of the rotating shaft, so that the cooling fan is rotated together with the rotating shaft; wherein the improvement comprises:
  the front cover is pressed to form a plurality of air guiding fins, which are bent from the peripheral portion of the front cover such that a plurality of first inlet holes are defined next to the corresponding air guiding fins, wherein the front cover is coupled to the housing through a mounting collar which has two sheaths and two mounting tubes, the two sheaths extending from one peripheral edge of the mounting collar and parallel to a central axis of the mounting collar, the mounting tubes extending from an opposite periphal edge of the mounting collar and parallel to the central axis of the mounting collar, wherein the two sheaths allow two electrical terminal blades provided in the housing to insert therethrough, while the two mounting tubes allow two fixing dowel rods provided in the housing to slide therein, whereby one portion of an air current generated by the cooling fan can be guided by the air guiding fins to pass through the first inlet holes of the front cover and thus to enter the housing for dissipating heat therein.

2. The motor of claim 1, wherein the front cover defines at its outer edge two opposite cutouts which are capable of engaging with the sheaths of the mounting collar, so as to fix the front cover in place.

3. The motor of claim 2, wherein the front cover defines a plurality of fixing holes, through which a plurality of screws are engaged with other portions of the housing, so that the front cover is fixed more firmly.

4. A motor including a housing, a front cover, a rotating shaft, and a cooling fan, wherein the housing defines therein an inner space with a front opening and has a rear closure wall opposite to the front opening, the rear closure wall defining a central hole and a plurality of outlet holes; the front cover, which is substantially disk-shaped, closes the front opening of the housing and has a central hub defining a central hole and has a peripheral portion formed around the central hub; the rotating shaft is mounted across the inner space of the housing, the rotating shaft having a first end which is inserted through the central hole of the rear closure wall and having a second end which is inserted through the central hole of the hub of the front cover; the cooling fan is fixed to the second end of the rotating shaft, so that the cooling fan is rotated together with the rotating shaft; wherein the improvement comprises:

the front cover is pressed to form a plurality of air guiding fins, which are bent from the peripheral portion of the front cover such that a plurality of first inlet holes are defined next to the corresponding air guiding fins, whereby one portion of an air current generated by the cooling fan can be guided by the air guiding fins to pass through the first inlet holes of the front cover and thus to enter the housing for dissipating heat therein; and the housing is pressed to form a plurality of air intercepting fins, which are bent outwardly such that a plurality of second inlet holes are defined next to the corresponding air intercepting fins, the air intercepting fins extending generally towards the cooling fan, at a predetermined angle of ($\Theta 2$) to a cross-sectional plane (C) of the housing which is perpendicular to the rotating shaft, the predetermined angle ($\Theta 2$) being greater than 90 degrees.

* * * * *